Jan. 2, 1940.  R. A. GOEPFRICH  2,185,435
BRAKE
Filed May 26, 1937  4 Sheets-Sheet 1
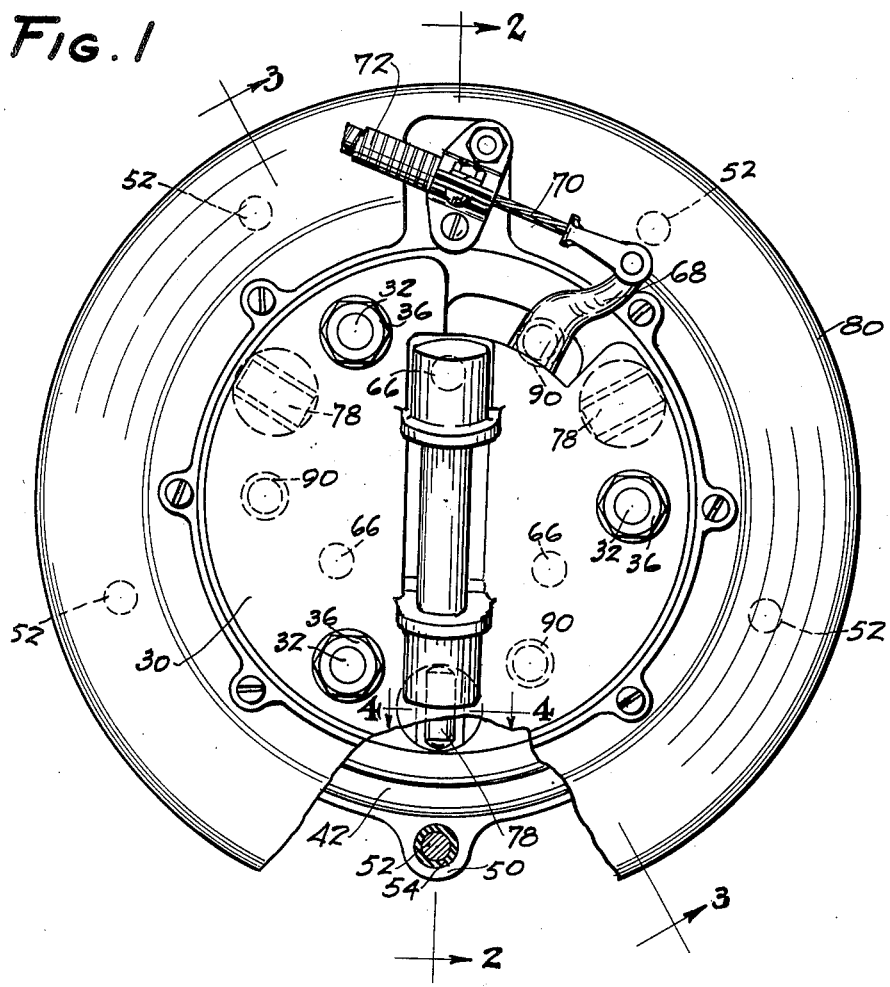
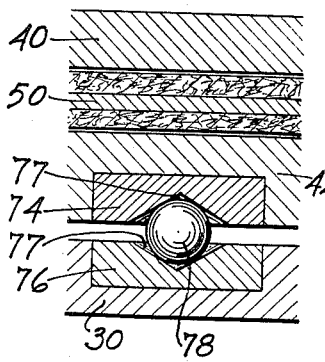
Inventor
RUDOLPH A. GOEPFRICH
By F. P. Keiper
Attorney Jan. 2, 1940.  R. A. GOEPFRICH  2,185,435
BRAKE
Filed May 26, 1937  4 Sheets-Sheet 2

Inventor
RUDOLPH A. GOEPFRICH
By F. P. Keiper
Attorney

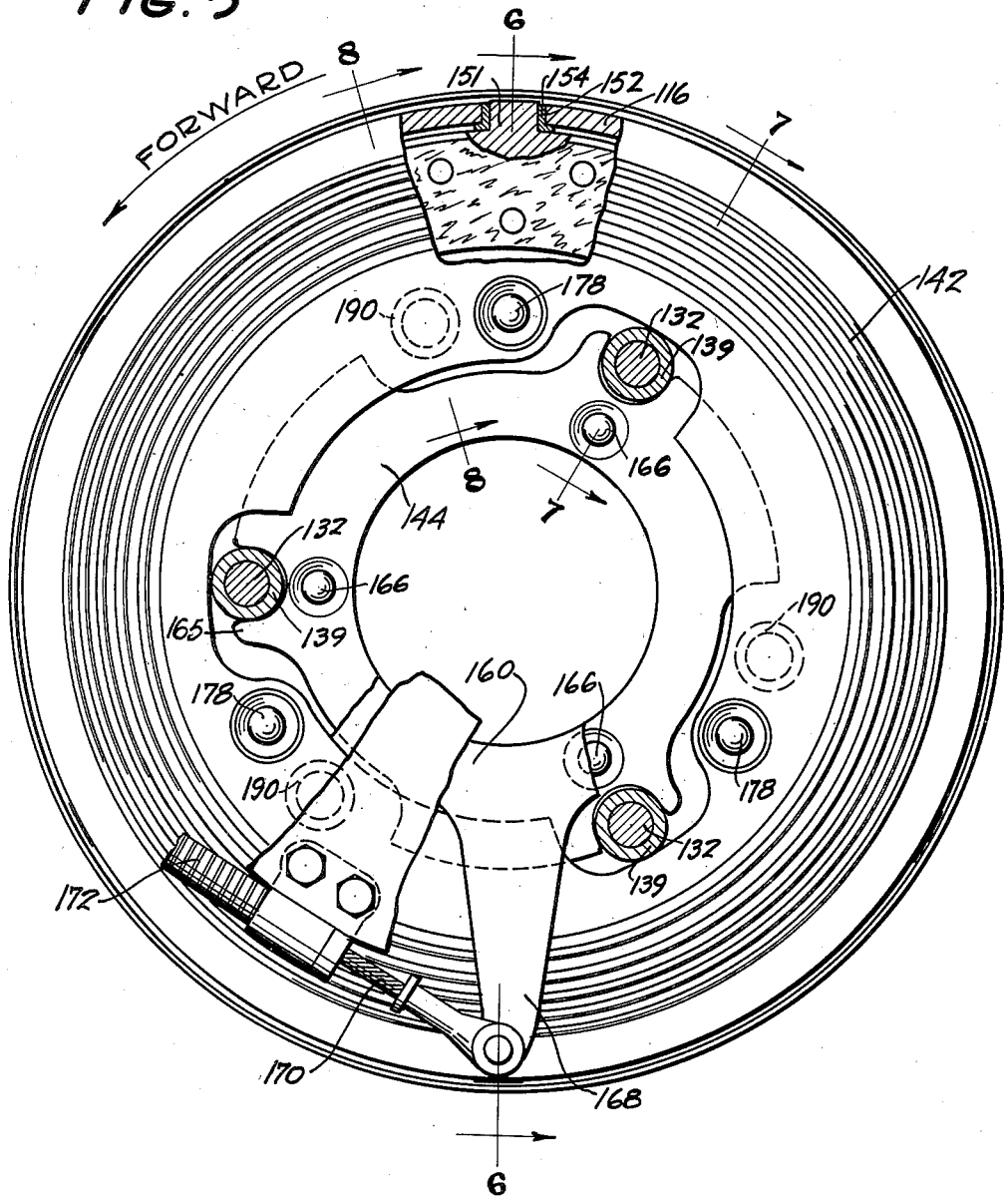

Jan. 2, 1940.　　　　R. A. GOEPFRICH　　　2,185,435
BRAKE
Filed May 26, 1937　　　4 Sheets-Sheet 4
FIG. 6
FIG. 7
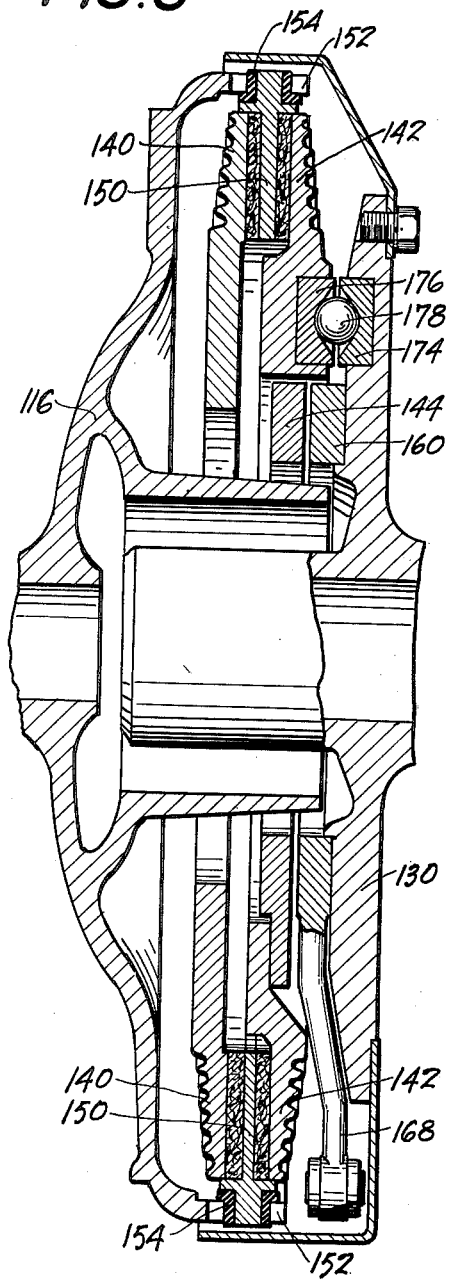
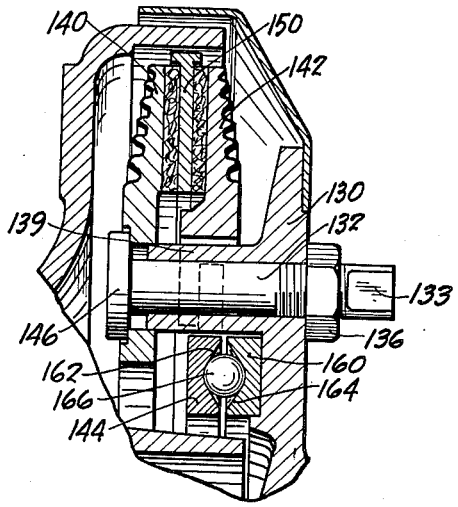
FIG. 8
INVENTOR
RUDOLPH A. GOEPFRICH
BY
J. P. Keiper
ATTORNEY Patented Jan. 2, 1940

2,185,435

UNITED STATES PATENT OFFICE 2,185,435

BRAKE

Rudolph A. Goepfrich, South Bend, Ind., assignor to Bendix Products Corporation, South Bend, Ind., a corporation of Indiana Application May 26, 1937, Serial No. 144,929

12 Claims. (Cl. 188—72)

This invention relates to disc brakes, and more particularly to brakes of the disc type wherein provision is made for introducing servo action derived from the rotating disc member.

In general, it is desirable, particularly in automotive vehicle brakes, to provide some arrangement whereby the operator applying force is augmented or increased by an additional or servo force derived from the kinetic energy of the moving vehicle and hence the rotation of the rotatable brake parts. In brakes of the drum type, most generally used commercially, the wrapping action of the friction shoe on the drum due to rotation of the drum, thereby tending to draw the shoe tighter around the drum, has been employed to a considerable extent, but in disc brakes, this simple effect is not present.

In the present invention, means are provided for creating a servo effect and the torque received by the stationary disc from a rotating brake plate is employed to further engage the disc with the plate. It is of course understood that such servo action results from manually controllable means for initially engaging the disc and plate to a greater or lesser degree, depending on the desired resulting effect.

More specifically, this invention has to do with improvements in the above type of brake relating to rigidity and simplification of structure and positiveness of control and resulting servo effect to the end that a brake with highly desirable operating characteristics results. It will of course appear that in a disc brake wherein servo action is employed, the servo action being not obtained directly from the rubbing parts as in the drum brake, but through some auxiliary torque responsive means, it is most necessary that the parts be rigid, simple and positive in their action so that undesirable characteristics will not be present, such as for example, chattering and grabbing.

Thus, the principal object of the invention is to provide a brake of the disc servo type, wherein the manual and servo operation results from an extremely simple compact and rigid arrangement of parts.

The foregoing object may be more specifically stated as being to provide a brake of the disc servo type, wherein servo and manual operation result from forces applied directly to the friction discs and reacting directly upon a fixed solid adjacent part, both servo and manual operating means acting on and reacting on the same parts.

Other objects of the invention have to do with the novel application of anti-friction structure to the operating means and servo applying means, as well as structure adapted to enclose the operating parts more or less completely against foreign matter and the elements, to which all vehicle wheel brakes are subjected, to a considerable degree.

The above and other novel features of the invention will appear more fully hereinafter from the following detailed description when taken in conjunction with the accompanying drawings. It is expressly understood, however, that the drawings are for purposes of illustration only and are not designed as a definition of the invention, reference being had for this purpose to the appended claims.

In the drawings, wherein like reference characters indicate like parts:

Fig. 1 is a view in elevation of the rear side of the brake, a portion of the back plate structure being broken away;

Fig. 4 is an enlarged detail view of a part of the servo applying structure, and is taken on the line 4—4 of Fig. 1;

Fig. 5 is a rear view in elevation of a modified form of brake;

Fig. 6 is a section taken through Fig. 5 on the line 6—6;

Fig. 7 is a partial section taken on the line 7—7 of Fig. 5, and

Fig. 8 is a partial section taken on the line 8—8 of Fig. 5.

Figure 3:
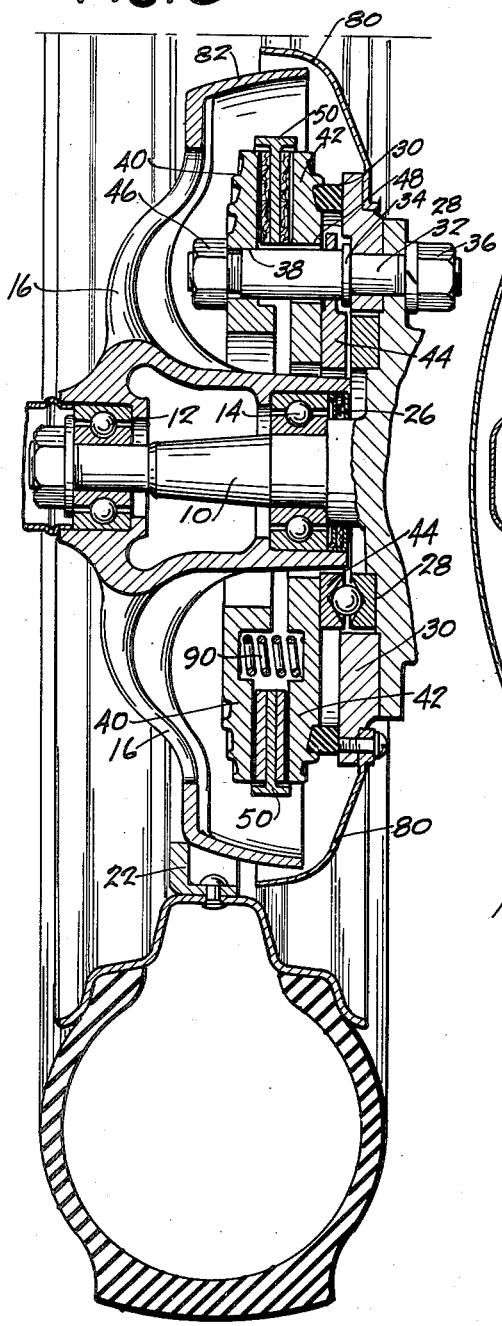
Fig. 3 is a section through the brake of Fig. 1 taken on the line 3—3.
Figure 2:
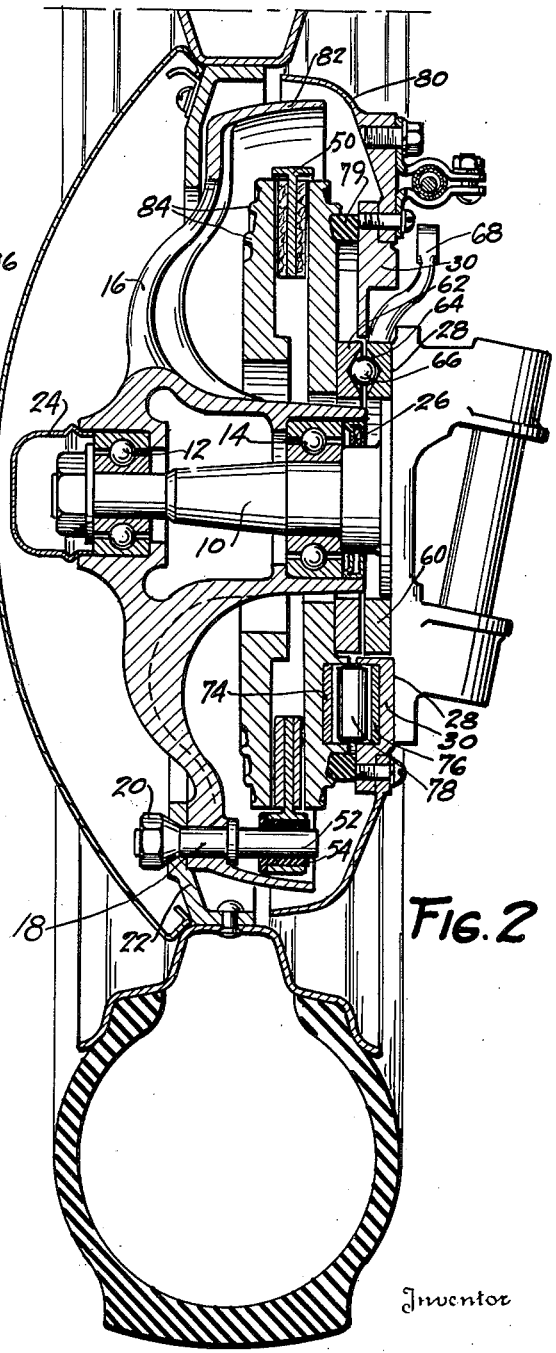
Fig. 2 is a section through the brake of Fig. 1 taken on line 2—2.

Referring to the drawings, and particularly Figs. 1-4, there is shown an axle spindle 10, the same for illustrative purposes only, being a front dirigible stub axle such as found on motor vehicles at the present time. The axle is provided with wheel bearings 12 and 14, which in turn carry a revoluble wheel hub member 16 to which is demountably secured through shouldered bolts 18 and nuts 20 a tire carrying rim member 22. The wheel bearings 12 and 14 may be packed in grease, which is retained against leakage into the hereinafter describd brake parts by a cap 24 and retainer 26.

The stub axle 10 has a shouldered or flange portion 28 which, together with a plate 30, form a support plate or means for the braking surfaces. As shown, the plate 30 is secured to the flange 28 by means of a plurality of studs 32, the parts being clamped between a shoulder 34 and nut 36. The studs 32 extend beyond the shoulder and have a smooth portion 38 upon which are threaded a stationary friction disc 40, a slightly rotatable friction disc 42, and a stationary actuating collar 44.

The disc 40 has a snug fit on the studs 32, whereby rotation is prevented, and its position is adjustable by reason of the nuts 46 against which the disc bears during braking. The disc 42 on the contrary is provided with circumferentially elongated holes 48 so that a certain amount of rotation can take place.

Between the discs 40 and 42 is a rotatable brake plate 50 slidably carried on pin projections 52 on the rim fastening bolts 18, the number of which may be varied to suit conditions. Rubber bushings 54 are preferably provided to relieve the friction and wear between the pin and brake plate as much as possible, or the bushing may be of a metal having an excess graphitic content and hence lubricating characteristics. Suitable lining may be carried by the plate 50, or the discs 40 and 42, or the lining may be in the form of loose rings secured to neither plate or discs.

In order to apply the brake initially from the manual control, relatively rotatable collars 44 and 60 are employed each having a plurality of matching conical recesses 62 and 64 in which are retained hardened balls 66. Rotation of collar 60 through the integrally attached lever arm 68, and cable and conduit 70 and 72 cause a spreading action between the collars 44 and 60, thereby initially engaging the friction discs 42 and 40 with the brake plate 50.

To provide servo action, the friction disc 42 and plate 30 are provided with a plurality of cylindrical plug members 74 and 76 as shown in Fig. 4, each plug member having a wide V shape groove 77 therein and adapted to receive, in conjunction with an adjacent similar plug, a roller 78. One of the plugs may be fixed against rotation in any suitable manner, whereas the other may rotate, or a roller of a tapered form may be used with V grooves suitably shaped to receive the same in the blocks, in which case the blocks may be fixed against rotation or left freely rotatable, since under the forces existing, they would of necessity maintain their proper positions.

In practice, a resilient or yieldable annular ring 79 of rubber, felt or the like may be positioned between the plate 30 and disc 42 to prevent the entrance of foreign matter and a shield 80 carrying the conduit 72 is also preferably provided, the same cooperating with a flange 82 on the wheel so as to practically protect the brake against foreign matter and yet permit a degree of circulation of air outwardly and past the braking discs 40 and 42, which latter, for cooling, have exposed annular ribs 84.

In operation, rotation of collar 60 moves collar 44 to the left causing disc 42 to engage plate 50, and shifting the latter into engagement with disc 40. Torque transmitted to disc 42, by reason of its friction contact with disc 50, causes it to tend to rotate, thereby making rollers 78 climb upon the V shape grooves, thus increasing the braking pressure. On release the pitch of the inclines 77 is such as to immediately permit return of disc 42, particularly under the release of the initial pressure from collar 44 and return springs 90.

In the modified form illustrated in Figs. 5–8, the basic features will be found to exist. The rotatable brake plate 150 is carried by the wheel member 116, the plate 150 having projections 151 with rubber bushings 154 extending into slots 152. The stationary disc 140 is carried preferably at three points on projecting hollow studs 139 integral with the backing plate 130, and bolts 132 extend through to secure the disc in proper position on the studs, and have heads 146 engaging the disc 140. The bolts at their opposite ends are flattened as at 133 and provided with nuts 136 so that the position of disc 140 can be conveniently adjusted from the outside, either for wear or initial clearance.

The servo disc 142, which is slightly rotatable, is supported primarily upon the servo applying means, which in the present modification is constituted by balls 178 lying in pairs of facing conical recess members 174 and 176, one of each pair being received in a corresponding socket in the disc member and the other being received in a similar manner in the backing plate. The return springs 190, reacting as they do on the fixed disc, retain the slightly rotatable disc in retracted position with the balls 178 lying in their deepest position in the recesses.

The manual applying means is similar to that employed in the other modification, there being a collar 144 held against rotation on the studs 139 by the integral yokes 165. A rotatable collar 160 adjacent thereto carries an extending lever arm 168 to which is attached a cable 170 threaded in a fixed conduit 172. Relative rotation between the collars 144 and 160 by reason of the thrust balls 166 lying in conical recesses 162 and 164 spreads the collars initially applying and subsequently controlling the application of the brake.

It will readily appear that the structures thus described are of unusual structural characteristics, particularly when rigidity, strength and simplicity are concerned. Both the applying means and the servo means react directly upon the rigid backing plate, and in turn act directly upon the friction discs. The elements are reduced to a minimum and their application is in a way as solid as a vise, thereby avoiding difficulties often encountered due to resiliency in the major force applying parts, and adjustment for wear is simplified.

Though only two embodiments of the invention have been illustrated and described, it is to be understood that the invention may be embodied in many various mechanical arrangements. Various changes may be made in the construction, proportioning and arrangement of parts, without departing from the spirit of the invention as will be apparent to those skilled in the art and reference therefore should be had to the appended claims for a limit of the definition of the invention.

What is claimed is:

1. In a disc brake, a fixed backing plate, a stationary friction disc secured to said backing plate in spaced relation thereto, a second friction disc between said first named disc and plate, a brake plate adapted for rotation between said discs, anti-friction wedge means for forcing said second friction disc upon slight rotation in either direction toward said fixed disc, resilient means urging the discs apart, and an applying device between the second disc and the backing plate comprising a pair of collars, one being fixed and the other rotatable, and anti-friction wedge means for spreading said collars on relative rotation between them, for forcing said second named disc toward said stationary disc.

2. In a disc brake, a rotatable brake plate, a stationary support plate, a relatively stationary friction disc intermediate said brake and support plates, means interposed between said disc and support plate and reacting thereupon for urging said disc towards said brake plate upon rotation of said disc relative to support plate, and a pair of spaced collars between said disc and plate, one of said collars being held against rotation, and means associated with said collars to cause spreading action upon rotation of one relative to the other, said collars being constructed and arranged to transmit said spreading action to said support plate and disc to move said disc into engagement with said brake plate.

3. In a disc brake, a rotatable brake plate, a stationary support plate, a relatively stationary friction disc intermediate said brake and support plates, means interposed between said disc and support plate and reacting thereupon for urging said disc towards said brake plate upon rotation of said disc relative to support plate, and a pair of spaced collars between said disc and plate, one of said collars being held against rotation, means associated with said collars to cause spreading action upon rotation of one relative to the other, said collars being constructed and arranged to transmit said spreading action to said support plate and disc to move said disc into engagement with said brake plate, and an annular band of yieldable material between the support plate and disc and surrounding and enclosing said urging means and said spreading means between the support plate and disc.

4. A disc brake comprising a fixed backing plate, a laterally and slightly rotatably movable friction disc, anti-friction spreading means therebetween acting to move said disc away from said plate upon relative rotation, and other relatively rotatable members between said disc and plate, including means for spreading the members on relative rotation and acting to move said disc away from said plate on relative rotation between the members.

5. In a disc brake, a backing plate forming a support member, axially extending studs secured thereto and arranged substantially on a circle, a pair of relatively fixed annular discs supported on said studs and a rotatable annular brake plate arranged around said studs, between the discs, a pair of relatively rotatable annular collars arranged inwardly of said studs, one of said collars being fixed against rotation and adapted to bear against the inner portion of one of the discs and the other being adapted to bear against said backing plate, and means for spreading the collars by relative rotation therebetween to move the one of said discs axially toward the other.

6. In a disc brake, a backing plate forming a support member, axially extending studs secured thereto and arranged substantially on a circle, a pair of relatively fixed annular discs supported on said studs and a rotatable annular brake plate arranged around said studs, between the discs, a pair of relatively rotatable annular collars arranged inwardly of said studs, one of said collars being fixed against rotation and adapted to bear against the inner portion of one of the discs and the other being adapted to bear against said backing plate, means for spreading the collars by relative rotation therebetween to move the one of said discs axially toward the other, and annular yielding means carried by either said one disc or the backing plate and enclosing the space therebetween.

7. In a disc brake, a backing plate, hollow axially extending studs thereon, a brake disc slidably mounted on the outside of said studs and bolts extending through the studs.

8. In a disc brake, a backing plate, hollow axially extending studs thereon, a brake disc slidably mounted on the outside of said studs and bolts extending through the studs, said bolts having a head in engagement with said disc, and an adjustable threaded means in engagement with said plate whereby the spacing between disc and plate may be adjusted.

9. In a disc brake, a support member, a friction disc adjacent said support member, a plurality of conically recessed members in said disc, a similar number of conically recessed members in said support member arranged in a similar pattern, said recesses facing one another, a thrust ball in each pair of recesses, resilient means urging said disc toward said support member, and a pair of collars having opposed conical recesses and thrust balls therein arranged between said disc and support, said collars being axially spread upon relative rotation.

10. In a disc brake, a support member, a friction disc adjacent said support member, a plurality of conically recessed members in said disc, a similar number of conically recessed members in said support member arranged in a similar pattern, said recesses facing one another, a thrust ball in each pair of recesses, resilient means urging said disc toward said support member, a pair of collars having opposed conical recesses and thrust balls therein arranged between said disc and support, said collars being axially spread upon relative rotation, and means for fixing one of said collars against rotation and for rotating the other, whereby to spread said collars on relative rotation and move said disc away from said support.

11. In a disc brake, a rotatable member to be braked having a cylindrical flange with an axial slot therein, an axially movable brake plate rotatable with said member having a radial lug extending into said slot, and rubber mounting means interposed between said lug and slot.

12. In a disc brake a support member, a friction disc positioned in spaced relation to said support member, a second friction disc between said disc and member, a rotatable brake plate between said discs, a plurality of conically recessed members in said second named disc, a similar number of conically recessed members in said support member aligned with the other recessed members, said recesses facing one another, a thrust ball in each pair of recesses, resilient means between said discs urging said discs apart, a pair of collars having opposed conical recesses and thrust balls therein arranged between said disc and support, said collars being axially spread upon relative rotation, means for fixing one of said collars against rotation and said first named friction disc, and means for rotating the other collar.

RUDOLPH A. GOEPFRICH.